(12) United States Patent
Elsherbini et al.

(10) Patent No.: US 10,921,524 B2
(45) Date of Patent: Feb. 16, 2021

(54) CRIMPED MM-WAVE WAVEGUIDE TAP CONNECTOR

(71) Applicant: Intel Corporation, Santa Clara, CA (US)

(72) Inventors: Adel A. Elsherbini, Chandler, AZ (US); Georgios C. Dogiamis, Chandler, AZ (US); Sasha N. Oster, Chandler, AZ (US); Erich N. Ewy, Chandler, AZ (US); Telesphor Kamgaing, Chandler, AZ (US); Johanna M. Swan, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 117 days.

(21) Appl. No.: 15/859,477

(22) Filed: Dec. 30, 2017

(65) Prior Publication Data
US 2019/0204508 A1 Jul. 4, 2019

(51) Int. Cl.
*G02B 6/28* (2006.01)
*H04W 4/38* (2018.01)
(Continued)

(52) U.S. Cl.
CPC ....... *G02B 6/2852* (2013.01); *G02B 6/12019* (2013.01); *G02B 6/3817* (2013.01);
(Continued)

(58) Field of Classification Search
CPC ............. G02B 6/2852; G02B 6/12019; G02B 6/3817; G02B 6/3857; H02P 5/107
See application file for complete search history.

(56) References Cited

U.S. PATENT DOCUMENTS 2,806,210 A * 9/1957 Edwards .................... H01P 5/20
333/122
3,500,264 A * 3/1970 Edwin, Jr. ............... H01P 1/042
333/254

(Continued)

FOREIGN PATENT DOCUMENTS

WO WO 2016/171930 10/2016

OTHER PUBLICATIONS

Search Report from European Patent Application No. 18209354.2, dated May 24, 2019, 8 pgs.

*Primary Examiner* — Peter Radkowski
(74) *Attorney, Agent, or Firm* — Schwabe, Williamson & Wyatt, P.C.

(57) ABSTRACT

Embodiments include a sensor node, a method of forming the sensor node, and a vehicle with a communication system that includes sensor nodes. A sensor node includes an interconnect with an input connector, an output connector, and an opening on one or more sidewalls. The sensor node also includes a package with one or more sidewalls, a top surface, and a bottom surface, where at least one of the sidewalls of the package is disposed on the opening of interconnect. The sensor node may have a control circuit on the package, a first millimeter-wave launcher on the package, and a sensor coupled to the control circuit, where the sensor is coupled to the control circuit with an electrical cable. The sensor node may include that at least one of the sidewalls of the package is crimped by the opening and adjacent and co-planar to an inner wall of the interconnect.

9 Claims, 9 Drawing Sheets

(51) Int. Cl.
  *H04W 4/48* (2018.01)
  *H01P 5/107* (2006.01)
  *H04L 12/40* (2006.01)
  *G02B 6/12* (2006.01)
  *G02B 6/38* (2006.01)
  *G05D 1/00* (2006.01)
  *H01Q 1/32* (2006.01)

(52) U.S. Cl.
  CPC ............ *G02B 6/3857* (2013.01); *H01P 5/107* (2013.01); *H04L 12/40189* (2013.01); *H04W 4/38* (2018.02); *H04W 4/48* (2018.02); *G05D 1/00* (2013.01); *H01Q 1/32* (2013.01); *H04L 2012/40273* (2013.01)

(56) References Cited

U.S. PATENT DOCUMENTS

| | | | |
|---|---|---|---|
| 4,453,142 A * | 6/1984 | Murphy | H01P 5/107 333/26 |
| 6,002,305 A * | 12/1999 | Sanford | H01P 5/107 333/26 |
| 6,144,266 A * | 11/2000 | Heidemann | H01P 5/107 333/26 |
| 6,265,950 B1 * | 7/2001 | Schmidt | H01P 5/107 333/26 |
| 6,639,486 B2 * | 10/2003 | Buck | H01P 5/107 333/26 |
| 6,950,062 B1 * | 9/2005 | Mather | H01P 1/185 333/156 |
| 7,592,887 B2 * | 9/2009 | Chao | H01P 1/042 333/254 |
| 7,657,330 B2 * | 2/2010 | Morrison | G01F 23/0069 398/2 |
| 7,692,508 B2 * | 4/2010 | Quan | H01P 5/107 333/1 |
| 8,350,638 B2 * | 1/2013 | White | H01P 5/028 333/24 C |
| 9,312,591 B2 * | 4/2016 | Herbsommer | H01P 3/16 |
| 9,917,341 B2 * | 3/2018 | Henry | H04B 3/56 |
| 2004/0052450 A1 * | 3/2004 | Morrison | G01F 23/0069 385/24 |
| 2008/0001686 A1 * | 1/2008 | Chao | H01P 1/042 333/254 |
| 2008/0258848 A1 * | 10/2008 | Quan | H01R 13/2421 333/260 |
| 2010/0060537 A1 * | 3/2010 | Nagayama | H01Q 1/247 343/776 |
| 2011/0121924 A1 * | 5/2011 | White | H01P 5/028 333/260 |
| 2013/0259428 A1 * | 10/2013 | Isenhour | G02B 6/3817 385/78 |
| 2014/0221763 A1 * | 8/2014 | Vayser | A61B 90/30 600/245 |
| 2014/0285292 A1 * | 9/2014 | Herbsommer | H01P 3/16 333/254 |
| 2015/0138954 A1 * | 5/2015 | Ross | H04L 12/42 370/225 |
| 2016/0351987 A1 * | 12/2016 | Henry | H04B 3/56 |
| 2017/0187100 A1 * | 6/2017 | Fotheringham | H01Q 1/42 |
| 2017/0222323 A1 * | 8/2017 | Brown | H01Q 9/065 |
| 2019/0000587 A1 * | 1/2019 | Vayser | A61B 90/30 |

* cited by examiner

FIG. 5A  FIG. 5B

CRIMPED MM-WAVE WAVEGUIDE TAP CONNECTOR

FIELD

Embodiments relate to semiconductor packaging. More particularly, the embodiments relate to semiconductor packages with crimped millimeter-wave waveguide (mm-wave waveguide) tap connectors.

BACKGROUND

As more devices become interconnected and users consume more data, many applications such as automotive and datacenter interconnects are demanding higher data rates over relatively longer distances. Traditional electrical connections are becoming increasingly expensive and power hungry to support the required data rates. For example, to extend the reach of a cable or the given bandwidth on a cable, higher quality cables may need to be used or advanced equalization, modulation, and/or data correction techniques employed which add power and latency to the system. Additionally, implementing multiple lanes (and thus multiple cables) to meet the data rate requirements results in higher weight and challenging cable routing.

Alternatively, optical interconnects and solutions are employed. Optical interconnects have lower tolerances for alignment which results in significant assembly and manufacturing problems. Additionally, the vibrations from the different sources in an automotive environment require special precautions for the design of connectors to avoid impacting the performance and increasing the risk of failure. Finally, optical interconnects are typically associated with high power consumption and increased costs.

BRIEF DESCRIPTION OF THE DRAWINGS

Embodiments described herein illustrated by way of example and not limitation in the figures of the accompanying drawings, in which like references indicate similar features. Furthermore, some conventional details have been omitted so as not to obscure from the inventive concepts described herein.

FIG. 5A is a perspective view of a vertical crimped mm-wave waveguide connector system, according to one embodiment.

FIG. 5B is a plan view of a vertical crimped mm-wave waveguide connector system, according to one embodiment.

DETAILED DESCRIPTION

Described herein are systems that include crimped millimeter-wave waveguide (mm-wave waveguide) tap connectors. Specifically, a crimped mm-wave waveguide connector system with patch based connectors, tapered slot based connectors or the like, is described below and a method of forming such system by merging (or crimping) two connector structures into one connected structure. These systems, as described herein, include dielectric and/or metallic waveguides communicatively coupled with sensor nodes to an electronic control unit (ECU) (also referred to as a main control unit (MCU)) in a ring architecture that are used in autonomous and/or self-driving vehicles, according to some embodiments.

In the following description, various aspects of the illustrative implementations will be described using terms commonly employed by those skilled in the art to convey the substance of their work to others skilled in the art. However, it will be apparent to those skilled in the art that the present embodiments may be practiced with only some of the described aspects. For purposes of explanation, specific numbers, materials and configurations are set forth in order to provide a thorough understanding of the illustrative implementations. However, it will be apparent to one skilled in the art that the present embodiments may be practiced without the specific details. In other instances, well-known features are omitted or simplified in order not to obscure the illustrative implementations.

Various operations will be described as multiple discrete operations, in turn, in a manner that is most helpful in understanding the present embodiments, however, the order of description should not be construed to imply that these operations are necessarily order dependent. In particular, these operations need not be performed in the order of presentation.

As used herein the terms "top," "bottom," "upper," "lower," "lowermost," and "uppermost" when used in relationship to one or more elements are intended to convey a relative rather than absolute physical configuration. Thus, an element described as an "uppermost element" or a "top element" in a device may instead form the "lowermost element" or "bottom element" in the device when the device is inverted. Similarly, an element described as the "lowermost element" or "bottom element" in the device may instead form the "uppermost element" or "top element" in the device when the device is inverted.

According to some embodiments, a crimped mm-wave waveguide connector system (herein referred to as "crimped connector system") may use patch based connectors and mm-wave closed or open waveguides (e.g., in the 60-120 GHz frequency bands) to enable exceedingly high data rates and low electrical losses. These embodiments of the crimped connecter connector system help to provide decreased electrical losses to automotive environments which would further help reduce the latency and equalization requirements.

Figure 1A:
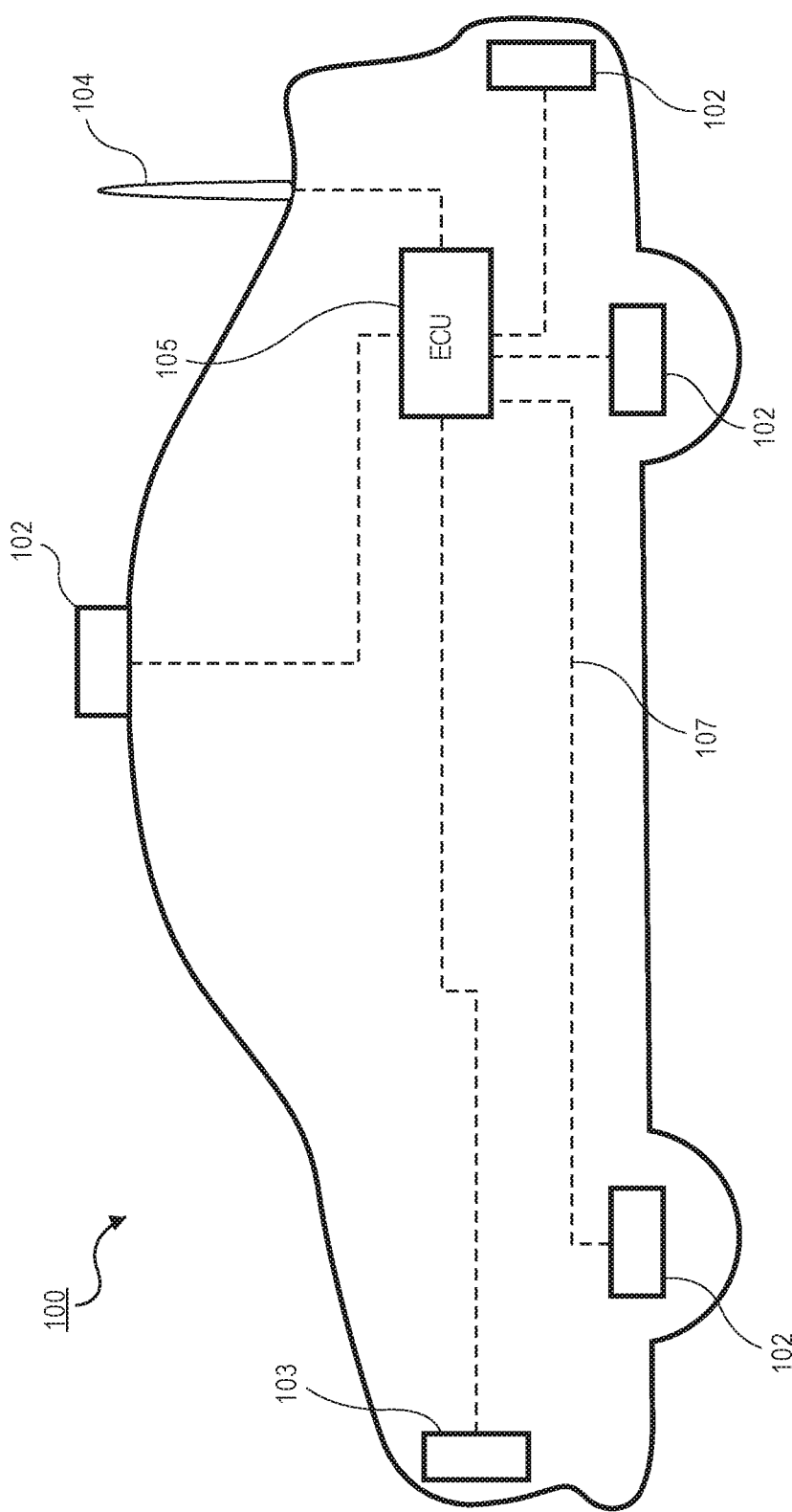
FIG. 1A is a cross-sectional view of a block diagram of an automobile that includes a plurality of sensors and other peripheral components that are communicatively linked to an electronic control unit (ECU).
Figure 1B:
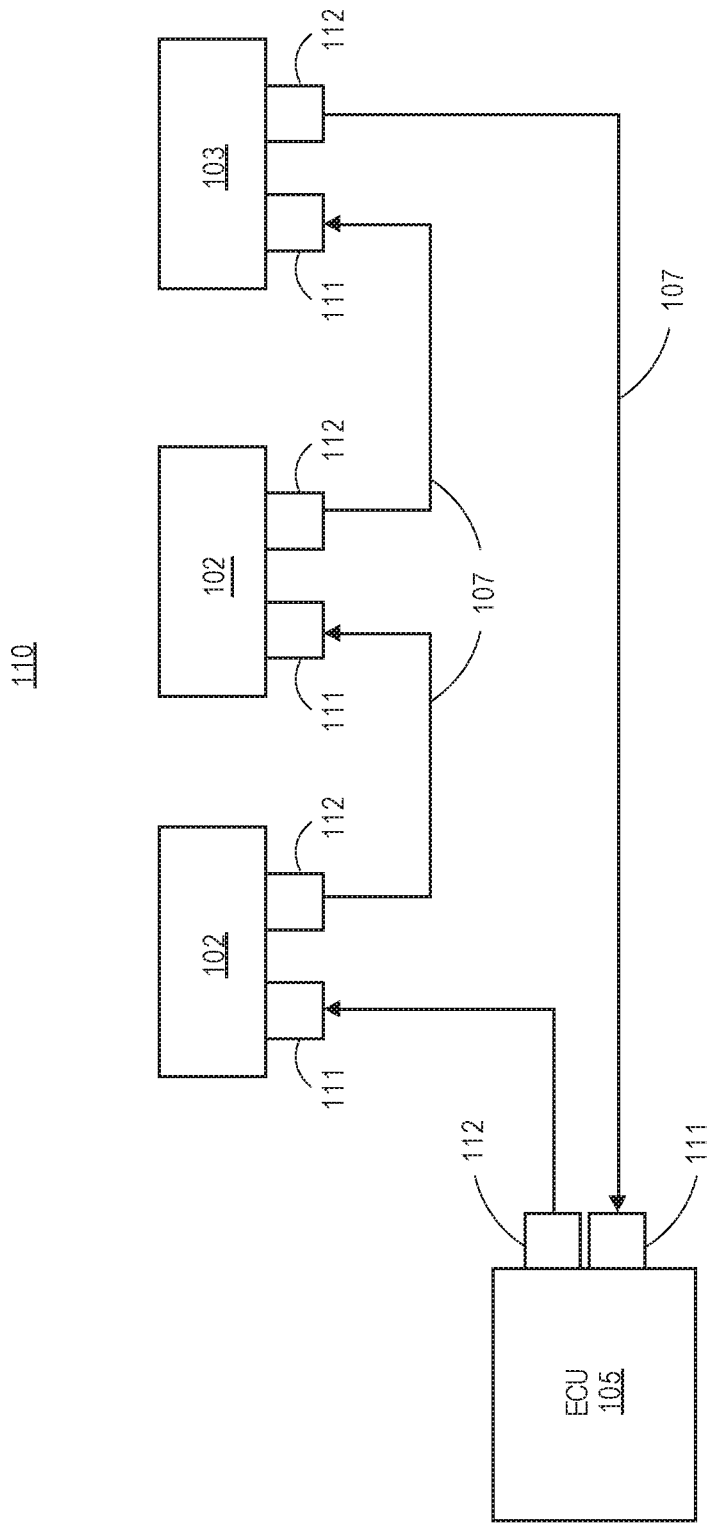
FIG. 1B is a block diagram of an automotive system that includes a plurality of sensors and other peripheral components that are communicatively linked to an ECU.
Figure 1C:
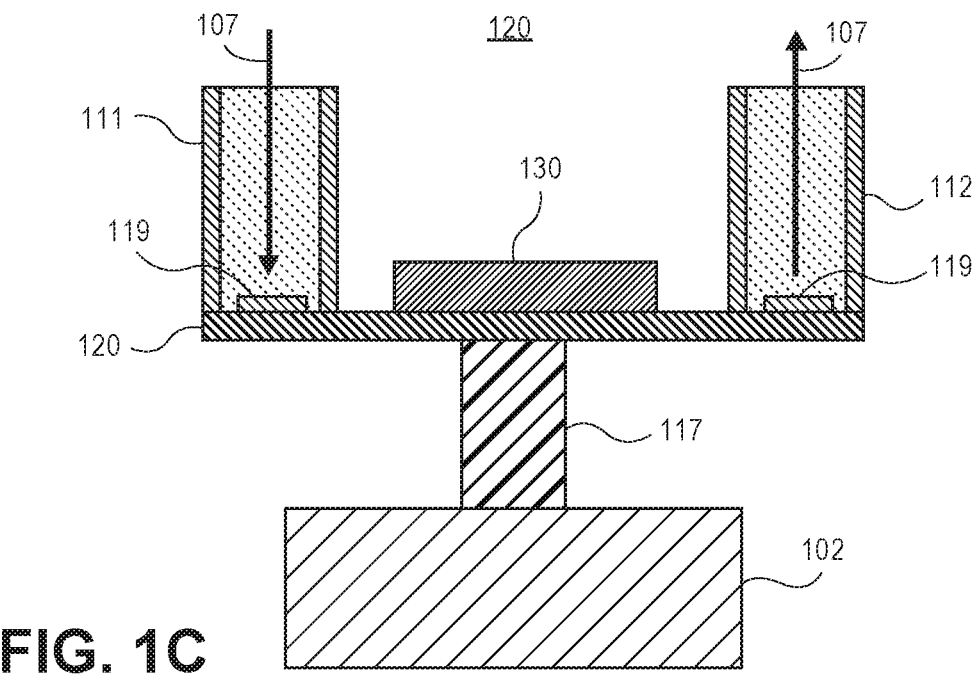
FIG. 1C is a perspective view of a two-connector system that includes an input connector, an output connector, a package, a radio-frequency (RF) control circuit, and a sensor.
Figure 2:
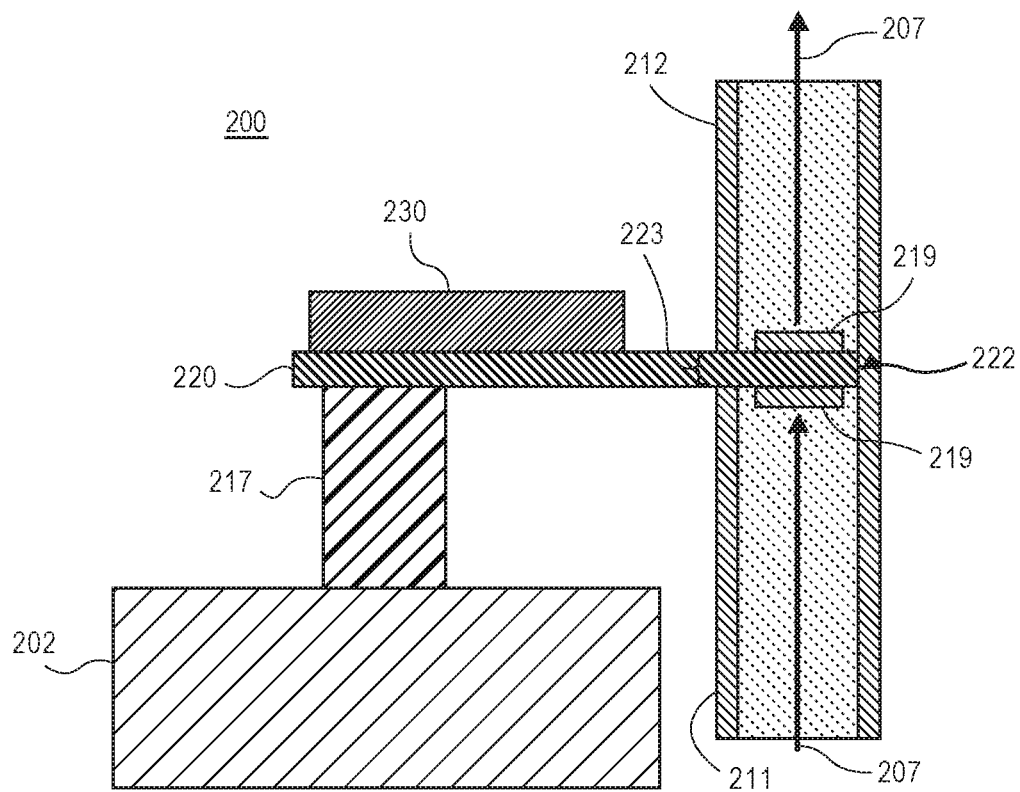
FIG. 2 is a perspective view of a crimped millimeter-wave waveguide (mm-wave waveguide) connector system that includes an input connector, an output connector, a package, a RF control circuit, and a sensor, according to one embodiment.

Automotive environments typically use a two connectors per node system (e.g., as shown in FIGS. 1B and 1C) that leads to an increase of connectors, sensor form factor, and additional possible points of failure. To overcome these problems (i.e., to reduce the total number of connectors, etc.) and provide improvements in these environments (or other related environments), the crimped connector system helps to merge the two connector per node system into a one connector per node system (e.g., as shown in FIG. 2), according to some embodiments. As such, these embodiments of the crimped connector system help to allow the connectors to be mechanically crimped into a single/main, unconnectorized, and continuous waveguide (i.e., rather than using two separate input and output waveguides and connectors, a single waveguide crimps both input and output connectors into one continuous structure), which reduces the number of connectors per node by half and the form factor of the overall system.

For some embodiments, the crimped connector system includes a single unconnectorized waveguide and a single connector per node (e.g., as shown in FIGS. 2 and 4-6) that enables a faster installment/assembly process and a reduction in overall cost. Additionally, according to these embodiments, the crimped connector system also helps with the maintenance of automotive systems as adding (and/or replacing) sensors is relatively cost-efficient, uncomplicated, and straightforward (e.g., a sensor may be added by directly tapping into the waveguide). For example, some embodiments of the crimped connector system may allow for the waveguide(s) to be repaired at a later time if the sensor(s) need to be removed or attached at a different location by using, for example, conductive epoxy.

Furthermore, as noted above, currently available interconnect solutions (i.e., electrical cables and optical cables) do not satisfy data rate, power consumption, latency, and cost targets needed for autonomous and/or self-driving vehicles (e.g., cars, trucks, trains, boats, planes, and any other autonomous transportation/cargo vehicle). Accordingly, the embodiments described herein include crimped mm-wave waveguide interconnect solutions. For one embodiment, the crimped mm-wave waveguide may include at least one of a metallic waveguide that uses one or more metal materials as a conductive shield (or enclosure), and a dielectric waveguide that has low-loss coated or uncoated dielectric materials, where these crimped mm-wave waveguide are designed to operate in the mm-wave or sub-THz frequency range. According to one embodiment, rather than having two waveguide connectors disposed (or formed) on a package, the crimped connector system provides a single waveguide connector with the package merged/crimped into the waveguide, separating one end as an input connector and the other end as the output connector (e.g., as shown in FIG. 2).

Additionally, when using short to medium length cables (e.g., 0.5-15 meters or greater), the mm-waveguide cables provide a low power, low latency, high-speed, and low cost solution. Particularly, since signals do not need to be upconverted to an optical signal, the power consumption is significantly lower than the power consumption of the alternative optical fiber interconnect technology. Likewise, in the short to medium length cables, there may be no need for error correction (EC), since achieved bit-error-rate level rates are very low (e.g., below 10E−12). Therefore, the embodiments of the crimped connector system may achieve a latency that is significantly lower as compared to the traditional electrical interconnects, especially at high data rates where EC is needed.

Accordingly, the embodiments of the crimped connector system also provide a decrease in overall weight and cost to the automotive, as the crimped connector system reduces the number of interconnect connectors needed to connect multiple sensors to the ECU. For example, each sensor typically requires a dedicated interconnect line with two connectors and, when an additional sensor is needed, instead of requiring two additional connectors per additional sensor (which increases the overall weight and cost of the system)—only one additional connector is needed per additional sensor.

FIG. 1A is a cross-sectional view of a block diagram of an automotive system 100 that includes a plurality of sensors 102 and other peripheral components 103-104 that are communicatively linked to an ECU 105. The automotive industry is rapidly progressing towards the production of autonomous and/or self-driving vehicles. Autonomous vehicles utilize many sensors that generate data regarding the position of the vehicle relative to surrounding objects, such as the road, other vehicles, traffic signals, lane markings, pedestrians, and the like. As illustrated in FIG. 1A, a vehicle 100 may include any number of sensors 102, video cameras 103, and positioning systems 104, such as global positioning systems (GPS). For example, sensors 102 may include video sensors, image sensors, ultrasonic sensors, radar sensors, light detection and ranging (LIDAR) sensors, or the like. The data generated from these components needs to be processed in order to determine how the vehicle needs to react. As such, the generated data is transferred from the peripheral components to the ECU 105 over a plurality of interconnects 107 (e.g., mm-wave waveguides). Accordingly, the additional peripheral sensors and other components needed for autonomous and/or self-driving vehicle results in a significant increase in the amount of data that is transferred within the vehicle.

Currently, autonomous vehicles that are being tested utilize data-transfers at rates between approximately 1.0 Gbps and 1.5 Gbps and employ four different low-voltage differential signaling (LVDS) lanes to allow for a total data rate between approximately 4.0 Gbps and 6.0 Gbps. However, the data rate needed in the subsequent generations of autonomous vehicles is expected to increase to approximately 10 Gbps or more (i.e., approximately 2.5 Gbps using four differential LVDS lanes). This increase in the data rate far exceeds the data rate of existing systems in currently available vehicles. For example, the standard for multimedia and infotainment networking in vehicles, i.e., media oriented systems transport bus (MOST), has a data transfer rate of 150 Mbps.

Some solutions for providing high-speed interconnects include electrical interconnects and optical interconnects. However, both suffer significant drawbacks when used in the automotive industry. Electrical connections, such as Ethernet, may be utilized by employing multiple lanes (i.e., cables) to reach the required bandwidth. However, this becomes increasingly expensive and power hungry to support the required data rates for short to intermediate (e.g., 5 m-10 m) interconnects needed in the automotive industry. For example, to extend the length of a cable or the given bandwidth on a cable, higher quality cables may need to be used or advanced equalization, modulation, and/or data correction techniques employed. Unfortunately, these solutions require additional power and increase the latency of the system.

Accordingly, optical transmission over fiber is capable of supporting the required data rates and distances needed for autonomous and/or self-driving vehicles. However, the use of optical connections may result in a power and cost penalty, especially for short and medium distances (e.g., 0.5 m-15 m) due to the need for conversion between optical and electrical signals. Furthermore, the alignment of optical interconnects needs to be precisely maintained. This proves to be difficult in automotive applications due to vibrations and other environmental conditions that may alter the alignment of the optical interconnects, and therefore, reduces the reliability of optical interconnects. Likewise, each optical interconnect typically requires two connectors per sensor, thus increasing the overall form factor. As such, both technologies (traditional electrical and optical, especially two-connector optical interconnects) are not optimal for autonomous and/or self-driving vehicles that require low-weight, high data-rate, low latency, and low power interconnect lines between peripheral sensors and the ECU.

FIG. 1B is a block diagram of an automotive system 110 that includes a plurality of sensors 102 and other peripheral components 103 that are communicatively linked with a plurality of interconnects 107 to an ECU 105. Note that the automotive system 110 of FIG. 1B is similar to the automotive system 100 of FIG. 1A, however the automotive system 110 includes a plurality of connectors 111-112.

The automotive system 110 may use mm-wave closed or open waveguides 107 in the 60-120 GHz frequency bands. As noted above, the automotive system 110 can also support very high data rates and have very low electrical losses which helps reduce the latency and equalization requirements. However, one of the limitations of such automotive system 110 is when it is required to connect multiple nodes 102-103 (e.g., cameras) in series. As shown in FIG. 1B, the automotive system 110 typically connects the ECU 105 with the multiple nodes 102-103 in series using two connecters per node, which includes an input connector 111 and an output connector 112, thereby requiring a total of 8 connectors for 4 nodes. Accordingly, this system requires multiple connectors (i.e., two connectors for each node that required and so on) which increases the sensor form factor and introduces additional possible points of failure.

FIG. 1C is a perspective view of a two connector system 120 that includes an input connector 111, an output connector 112, a package 120, a radio-frequency (RF) control circuit 130, an interconnect 117, and a sensor 102. Note that the two connector system 120 is similar to any of the nodes (e.g., sensors 102 and camera 103) of FIG. 1B.

As shown in FIG. 1C, the two connector system 120 includes both the input connector 111 and the output connector 112 disposed on the package 120 (typically on opposite ends), where each connector 111-112 may have a connection point 119 that receives and/or outputs the signal from and to the interconnect 107. The package 120 may be any substrate/package, such as a printed circuit board (PCB), a high-density interconnect (HDI) board, a ceramic substrate or an organic semiconductor packaging substrate. Additionally, the RF control circuit 130 is formed on the package 120, where the package 120 is communicatively coupled to the sensor 102 with an interconnect 117 (e.g., a standard cable, such as a coaxial cable). Typically, the two connector system 120 is communicatively coupled with interconnects 107 (e.g., the mm-wave waveguide interconnects). Some of the problems encountered with this two connector system 120, as illustrated in FIG. 1C, is that the system requires (i) an increased form factor, (ii) additional components (i.e., additional connectors, connection points, additional surface area for the package, interconnects, etc.), (iii) a slower installation process, and (iv) an overall increased weight and cost.

FIG. 2 is a perspective view of a crimped mm-wave waveguide connector system 200 that includes an input connector 211, an output connector 212, a package 220, a RF control circuit 230, an interconnect 217, and a sensor 202, according to one embodiment. Note that the crimped mm-wave waveguide connector system 200 (or the crimped connector system) is similar to any of the nodes (e.g., sensors 102 and camera 103) of FIG. 1B.

As used herein, a "crimped connector system" (also referred to as a sensor node) refers to an interconnect with an input connector, an output connector, and an opening on one or more sidewalls of the interconnect; and a package with one or more sidewalls, a top surface, and a bottom surface that is opposite of the top surface, where at least one of the sidewalls of the package is disposed (crimped, inserted, merged, pressed, etc.) on the opening of the interconnect. Specifically, as used herein, the "crimped connector system" refers to a system having both input and output connectors mechanically crimped (merged or pressed) into a single, unconnectorized, and continuous waveguide. Note that, as described herein, the "crimped connector system" has one in-line connector structure that may have the input connector on one end and the output connector on the opposite end (i.e., even if the input and output connectors are described separately, both connectors are crimped together to form one in-line connector structure (as shown in FIG. 2)).

Furthermore, the "crimped connector system" also refers to a package that is disposed (i.e., crimped, merged or pressed) in between the input and output connectors of the single waveguide. The "crimped connector system" may have one end (or sidewall) of the package disposed/crimped (inserted and/or pressed) into an opening of the single waveguide (e.g., an opening may be formed by cutting the shield/enclosure of the waveguide to form the opening). Accordingly, the "crimped connector system" may have that one end pressed against an inner wall of the single waveguide (or pressed within a close proximity of the inner wall of the singe waveguide based on the desired packaging design and/or application (e.g., based on the needed insertion loss (dB) and/or isolation (dB) as a function of the separation between the inner wall of the waveguide and the top ground plane (and/or the sidewall) of the package)).

For one embodiment, the package 220 has a top surface and a bottom surface that is opposite of the top surface, and the package 220 also has one or more sidewalls (or ends). According to one embodiment, the package 220 may be crimped/pressed in between the input connector 211 and the output connector 212 that are crimped together to form the single waveguide 207 (also referred to as an interconnect). Note that the interconnect 207 may be a single, continuous interconnect (e.g., a metallic (or metal coated) waveguide, a dielectric waveguide, etc.) that is communicatively coupled in-line with the input and output connectors 211-212 of each node (e.g., sensor 202) of the automotive/datacenter system (or any other system needing a crimped connector system).

For one embodiment, the package 220 may have one of the sidewalls pressed into an opening 223 of the interconnect 207 as the one sidewall is thus pressed against an inner wall 222 of the interconnect 207 (i.e., at least one of the sidewalls of the package 220 is adjacent and co-planar to the inner wall 222 of the interconnect 207). Note that, as described above, the sidewall of the package 220 may be completely pressed against the inner wall 222 of the interconnect 207 or may have a small gap between the sidewall of the package 220 and the inner wall 222 of the interconnect 207, where the small gap has a negligible impact on the system 200. Accordingly, the package 220 is thus mechanically crimped and disposed between the input connector 211 and the output connector 212. In addition, the RF control circuit 230 is formed (or disposed) on the package 220, where the package 220 is communicatively coupled with the sensor 202 using an interconnect 217 (e.g., a coaxial cable). For example, the interconnect 217 may be any suitable electrical cable, such as a twinaxial cable, or the like. According to one embodiment, the RF control circuit 230 is communicatively coupled to the sensor 202 which may up convert the low-frequency data stream generated by the sensor 202.

For one embodiment, the RF control circuit 230 receives an input RF signal from a connection point 219 (also referred to as a patch based launcher, a tapered slot based launcher, or any other mm-wave signal launching structure) of the input connector 211, then splits the input RF signal by frequency using a diplexer (e.g., diplexer 301 of FIG. 3) into an in-band signal that is fed into an transceiver (e.g., mm-wave transceiver 302 of FIG. 3), feeds an out-of-band signal through a power combiner (e.g., power combiner 303 of FIG. 3), and lastly outputs an output RF signal (which may include a combination of the out-of-band signal and an RF output signal from the transceiver) to a connection point 219 of the output connector 212, where the output feed (or the output RF signal) therefore introduces minimal latency into the system 200 (as more connectors are added). Accordingly, the RF control circuit 230 on the package 230 sends the output RF signal to the connection point 219 of the output connector 212, which is then transmitted with the interconnect 207 to other connectors/nodes. Note that the RF control circuit 230 is described in further detail below in FIG. 3.

According to some embodiments, the package 220 may include, but is not limited to, a package, a substrate, a printed circuit board, and a motherboard. For one embodiment, the package 220 is a PCB. For one embodiment, the PCB is made of an FR-4 glass epoxy base with thin copper foil laminated on both sides (not shown). For certain embodiments, a multilayer PCB can be used, with pre-preg and copper foil (not shown) used to make additional layers. For example, the multilayer PCB may include one or more dielectric layers, where each dielectric layer can be a photosensitive dielectric layer (not shown). For some embodiments, holes (not shown) may be drilled in the package 220. For one embodiment, the package 220 may also include conductive copper traces, metallic pads, and holes (not shown).

For some embodiments, the interconnect 207 and the input and output connectors 211-212 are metallic waveguides and connectors with metallic and metal coated waveguide structures, such waveguide structures may include rectangular, circular, polygonal, oval, and other shapes. In addition, these metallic waveguide structures may include hollow members, members having a conductive and/or non-conductive internal structure, and hollow members partially or completely filled with a dielectric material. In one embodiment, the interconnect 207 has a metallic coating (not shown) to provide electrical shielding to the waveguide. In some embodiments, the metallic coating may be used as a power line. For example, power may be applied on a shield along the waveguide(s) (or electrical cables). While a single interconnect 207 is shown extending to and from connectors 211-212, it is to be appreciated that a bundle of two or more interconnects may be coupled to the connectors 211-212.

According to additional embodiments, the interconnect 207 may be plugged into an ECU (not shown) and coupled to other sensors (not shown) (e.g., as illustrated in FIG. 1B, but using the crimped connectors for each sensor/node). In addition, it is to be appreciated that any number of sensors may be used so long as the bandwidth of the interconnect 207 is not exceeded. For one embodiment, the interconnect 207 may be suitable for propagating mm-wave signals. In one embodiment, the interconnect 207 includes a dielectric waveguide that is made out of low loss coated or uncoated dielectric materials designed to operate in the mm-wave or sub-THz frequency range. For these additional embodiments, the interconnect 207 may be any suitable dielectric material, such as liquid crystal polymer (LCP), low-temperature co-fired ceramic (LTCC), high temperature co-fired ceramic (HTCC), glass, polytetrafluoroethylene (PTFE), expanded PTFE, low-density PTFE, ethylene tetrafluoroethylene (ETFE), fluorinated ethylene propylene (FEP), polyether ether ketone (PEEK), perfluoroalkoxy alkanes (PFA), combinations thereof, or the like. For one embodiment, the interconnect 207 may have any shaped cross section, including, but not limited to, rectangular (with or without rounded corners), square, circular, oval, among others. While referred to as a single interconnect/waveguide, it is to be appreciated that the interconnect 207 may be comprised of a plurality of distinct interconnects/waveguides. For example, a vehicle (as shown in FIG. 1A) may have a communication system that includes a first interconnect coupling the ECU to a first sensor node of a plurality of sensor nodes, and subsequent interconnects 207 coupling each of the subsequent sensor node(s) 202 (cameras or other peripheral components) to each other in a continuous, ring architecture, according to some embodiments.

For one embodiment, a vehicle (not shown) may include any number of sensors 202, video cameras (not shown), and positioning systems (not shown), such as GPS. For example, the sensor 202 may include, but is not limited to, video sensors, image sensors, ultrasonic sensors, radar sensors, light detection and ranging (LIDAR) sensors, or the like.

In addition, while illustrated as being disposed on top and bottom surfaces of the package 220, it is to be appreciated that the connection points 219 and connectors 211-212 may be formed at any location of the package 220 (as long as the connectors are crimped into one continuous waveguide). In the illustrated embodiment, the connectors 211-212 are shown without a protective enclosure in order to not obscure the Figure. However, it is to be appreciated that the connectors 211-212 may include multiple different packaging substrates, protective enclosures, overmolding, heat management solutions, and/or other needed components. Likewise, the RF control circuit 230 may be packaged on the package 220 and may be substantially enclosed by a protective casing. Furthermore, while the RF control circuit 230 is illustrated as a single block, it is to be appreciated that the RF control circuit 230 may include any number of discrete dies, interconnects, and/or other components (as further described below in FIG. 3).

According to these embodiments, one the advantages of the crimped connector system—as compared to, e.g., the two-connector system illustrated in FIG. 1A—is that a single, unconnectorized, and continuous waveguide can be used to communicatively couple each of the sensors and other peripheral components to the ECU of the vehicle. As such, rather than requiring multiple interconnects to couple each of the sensors and peripheral components directly to the ECU (i.e., two interconnects per each node are needed to be coupled to the ECU) (as shown in FIG. 1A), the crimped connector system 200 enables the ECU to be coupled in-line with the sensors and peripheral components of the vehicle as in a single, ring architecture.

Note that the crimped connector system 200 may include fewer or additional packaging components based on the desired packaging design.

Figure 3:
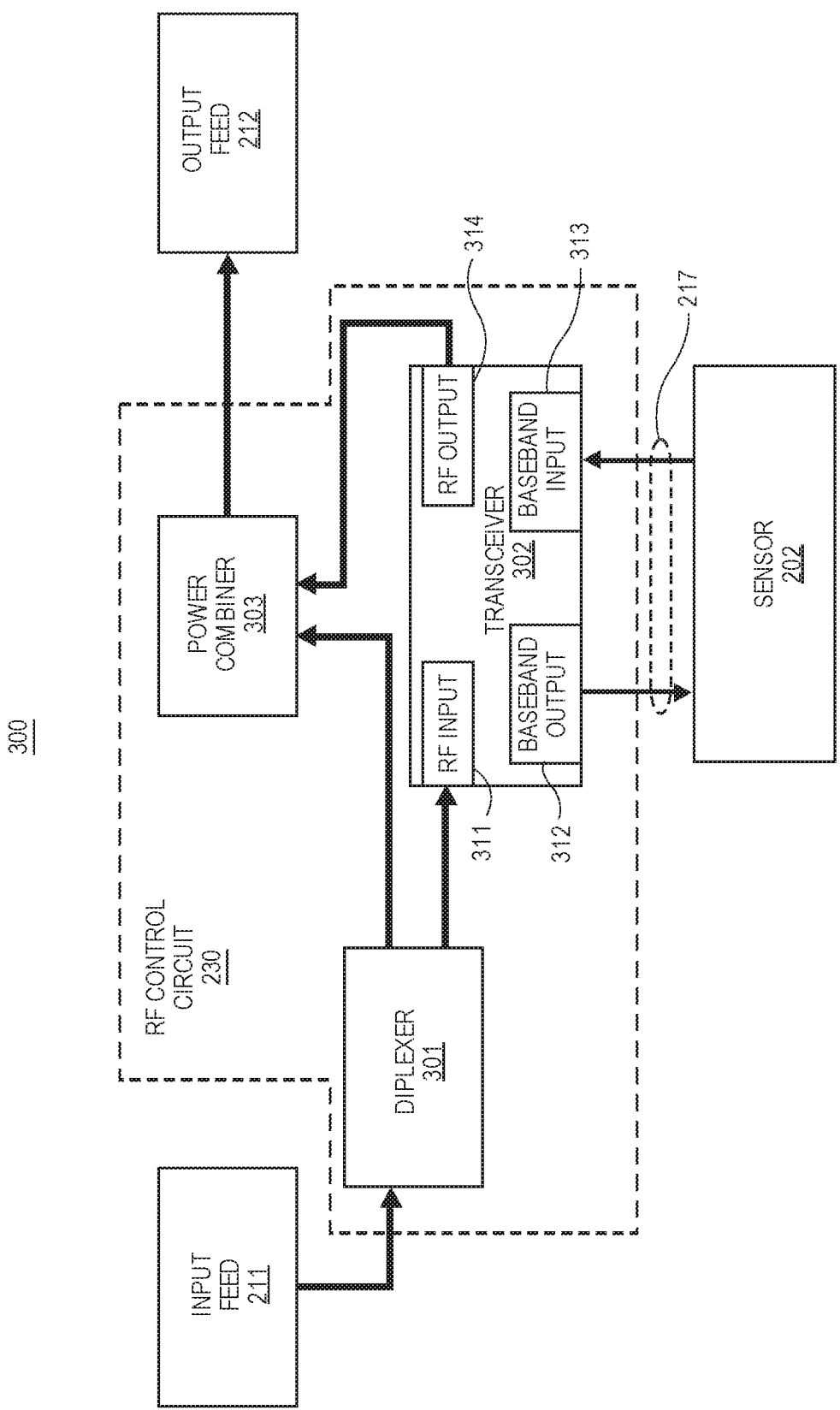
FIG. 3 is a block diagram of a schematic illustration of a crimped mm-wave waveguide connector system that includes an input connector, an output connector, a RF control circuit, and a sensor, according to one embodiment.

FIG. 3 is a block diagram of a schematic illustration of a crimped mm-wave waveguide connector system 300 that includes an input connector 211, an output connector 212, an RF control circuit 230, and a sensor 202, according to one embodiment. FIG. 3 is a more detailed schematic illustration of the RF control circuit 230, as shown in FIG. 2. Note that one or more well-known features may be omitted or simplified in order not to obscure the illustrative implementations.

According to some embodiments, the RF control circuit 230 is communicatively coupled to the sensor 202, the input connector 211 ("INPUT FEED"), and the output connector 212 ("OUTPUT FEED"). For one embodiment, the RF control circuit 230 may include, but is not limited to, a diplexer 301, a transceiver 302 (or a mm-wave transceiver), and a power combiner 303. Note that the RF control circuit 230 may be illustrated with a dotted line as the schematic circuit may be modified or rearranged to include one or more additional electrical components based on the desired application. According to one embodiment, the transceiver 302 may include, but is not limited to, an RF input 311, a baseband output 312, a baseband input 313, and a RF output 314.

For one embodiment, the RF control circuit 230 receives an input RF signal from the input connector 211. The RF control circuit 230 may receive the input RF signal at the diplexer 301, where the diplexer 301 may be receiving a signal transmitted from another sensor, peripheral component (e.g., camera), or the ECU over the main waveguide (e.g., the interconnect 207 of FIG. 2) that contains the desired frequency for communicating with the sensor 202. Accordingly, the diplexer 301 splits the input RF signal by frequency into an in-band signal that is transmitted to the RF input 311 of the transceiver 302. Likewise, as the diplexer 301 splits the input RF signal by frequencies, the diplexer 301 transmits an out-of-band signal to the power combiner 303. Furthermore, the transceiver 302 demodulates the in-band signal received at the RF input 311, and then the baseband output 312 transmits the demodulated data (or signal) to the sensor 202 via the interconnect 217. For one embodiment, the sensor 202 transmits data/signal with the interconnect 217 to the baseband input 313 of the transceiver 302. For example, the signal from the sensor 202 may be transmitted to the baseband input 313 of the transceiver 302, where it is up-converted to mm-wave RF signal by the transceiver 302. The up-converted signal may then be transmitted to the power combiner 303, where the up-converted signal may be combined with the out-of-band signal received from the diplexer 301.

For example, the transceiver 302 may perform the RF modulation of the signal transmitted by the sensor 202 and received at the baseband output 313. For one embodiment, after the RF modulation, the RF output 314 of the transceiver 302 transmits the signal (i.e., the up-converted signal) to the power combiner 303. According to some embodiments, the power combiner 303 receives both the out-of-band signal and the up-converted signal and combines both signals to transmit an output RF signal to the output connector 212, thus introducing minimal latency into the overall system as more connectors are added. For one embodiment, the output connector 212 and launcher may then propagate the combined signals of the power combiner 303 along a single unconnectorized waveguide (e.g., the interconnect 207 of FIG. 2).

As noted above, the RF control circuit 230 may be fabricated on a package (e.g., package 220 of FIG. 2). The package may be any suitable substrate and may include an enclosure or other protective covering (not shown). In the illustrated embodiment, the RF control circuit 230 is connected to the sensor 202 with the interconnect 217 (e.g., an electrical cable). However, it is to be appreciated that RF control circuit 230 and the sensor 202 may be co-located on the same package, and therefore the interconnect 217 may be omitted. According to an embodiment, the RF control circuit 230 includes only passive components. As such, no additional power needs to be consumed in order to process RF signals and propagate them along the metallic (and/or dielectric) waveguides (e.g., the waveguide 207 of FIG. 2).

For one embodiment, as described herein, the RF control circuit 230 is coupled to the single unconnectorized waveguide and connector per node (e.g., the interconnect 207 with the crimped and continuous connectors 211-212 of FIG. 2). The input connector 211 and the output connector 212 may be crimped into the single unconnectorized waveguide. The input and output connectors 211-212 may include hardware for physically coupling the single unconnectorized waveguide to the RF control circuit 230 and a launcher that may launch and assist the propagation of the mm-wave signal along the single waveguide. The launcher may be any known launcher for initiating the propagation of mm-waves or receiving mm-waves, such as a patch launcher, a tapered slot launcher, a stacked-patch launcher, a microstrip-to-slot transition launcher, a leaky-wave launcher, etc. (e.g., some of these launchers and embodiments are illustrated in FIG. 4-6). Similarly, as shown in FIG. 2, the output connector 212a is substantially similar to the input connector 211.

According to an embodiment, the size of the RF control circuit 230 may be dependent on the frequency of operation. In an embodiment, the signals may include a plurality of bands that occupy frequencies, for example, between approximately 30 GHz and 300 GHz. Some embodiments may include frequency bands that provide data rates, for example, between approximately 1 Gbps and 10 Gbps. For example, at an operating frequency of approximately 60 GHz, the physical area needed for components, such as the diplexer 301 and/or the power combiner 303 may be approximately 3 mm×3 mm or smaller. Accordingly, the space occupied by the RF control circuit 230 is not significant in relation to the overall size of the vehicle (and/or datacenter). For one embodiment, the one or more components of the RF control circuit 230 may be designed using passive components such as transmission lines in a hairpin pattern, a zig-zag pattern, coupled microstrip lines, or the like. Additional embodiments may also include open loop resonators for the design of the diplexer 301 and/or the power combiner 302. In an embodiment, the package substrate 350 may include a plurality of dielectric layers. For one embodiment, one or more dielectric layers (not shown) may separate layers of transmission lines used to form the components illustrated in FIG. 3. For example, the dielectric layers may be any suitable layers and may have thicknesses between approximately 10 μm-300 μm.

Note that the crimped connector system 300 may include fewer or additional packaging components based on the desired packaging design.

Figure 4A:
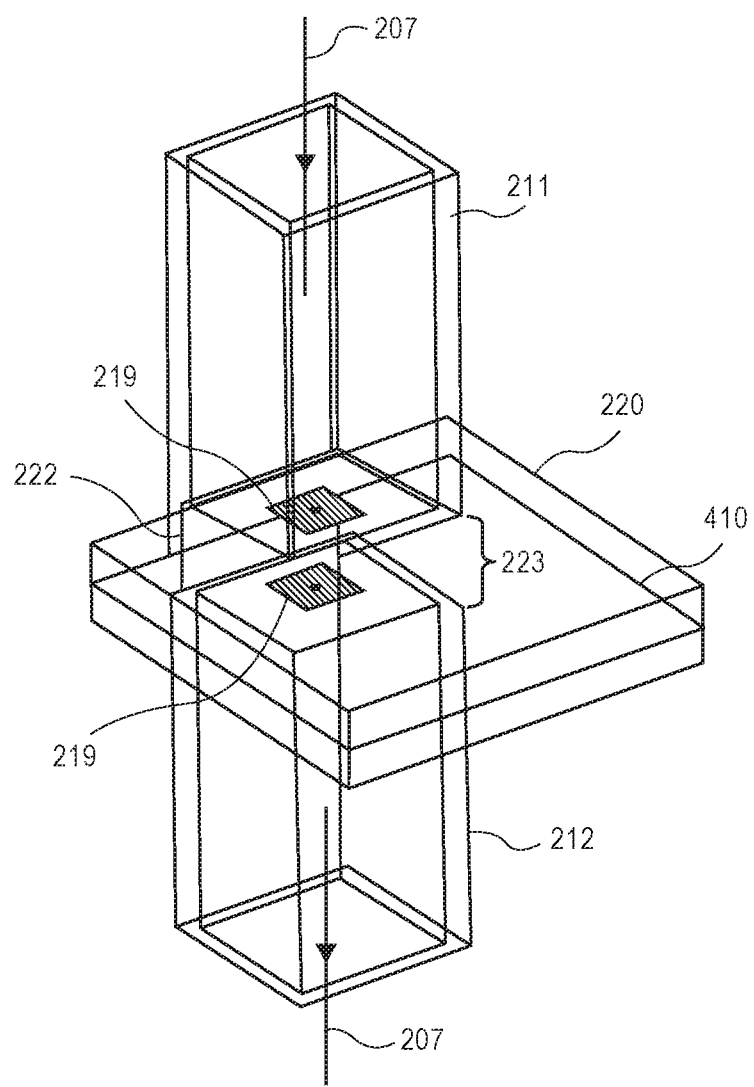
FIG. 4A is a perspective view of a crimped mm-wave waveguide connector system, according to one embodiment.
Figure 4B:
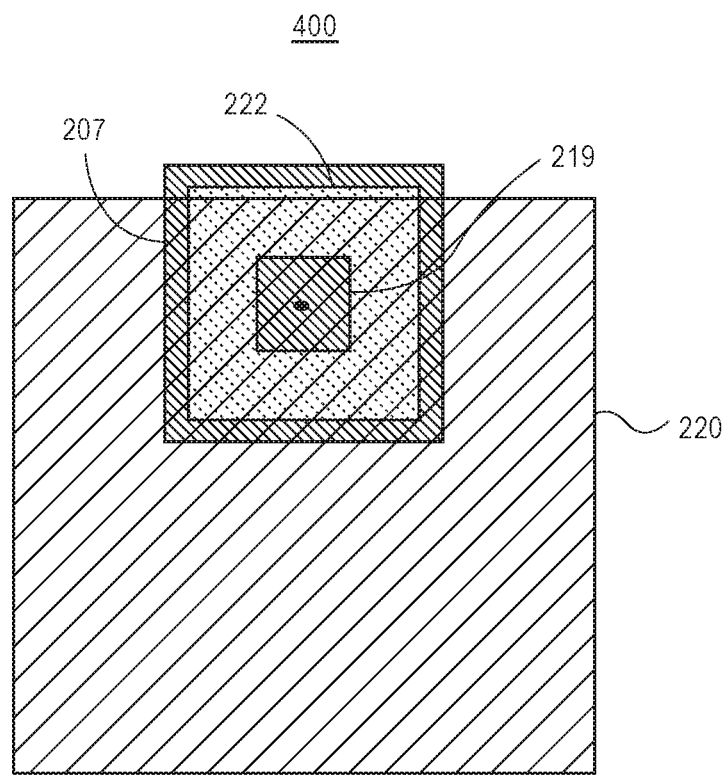
FIG. 4B is a plan view of a crimped mm-wave waveguide connector system, according to one embodiment.
Figure 4C:
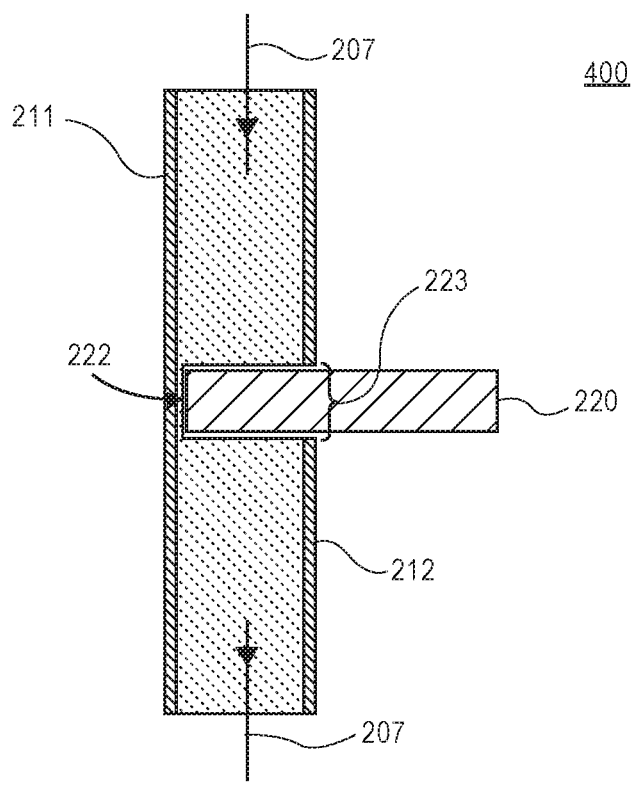
FIG. 4C is a cross-sectional view of a crimped mm-wave waveguide connector system, according to one embodiment.

FIG. 4A is a perspective view of a crimped mm-wave waveguide connector system 400, according to one embodiment. In addition, FIG. 4A illustrates a three-dimensional (3D) view of the crimped connector system 400 with an input connector 211, an output connector 212, a package 220, and an interconnect 207 (or waveguide). Note that the crimped connector system 400 of FIGS. 4A-4C is similar to the crimped connector systems 200 and 300 of FIGS. 2-3. Also note that one or more well-known features may be omitted or simplified in order not to obscure the illustrative implementations (e.g., the additional feed circuits, the RF control circuit, etc., are not shown for clarity).

According to one embodiment, the crimped connector system 400 has the interconnect 207 crimped with the package 220, where the interconnect 207 has an input connector 211 and an output connector 212 to receive and output, respectively, the data transmitted by the interconnect 207. Note that, for illustration purposes, the input connector 211 is formed above the package 220 and the output connector 212 is formed below the package 220, but the connectors 211-212 are not limited to this illustrated orientation (i.e., the input connector 211 may be formed below the package 220, while the output connector 212 is formed above the package 220).

As illustrated in FIG. 4A, the interconnect 207 is a metallic waveguide with metallic connectors 211-212 that has a rectangular shape, however the interconnect 207 and connectors 211-212 may be formed with dielectric material (or a combination of dielectric and metallic materials) and have any desired shape (i.e., oval, triangular, etc.). For one embodiment, the package 220 is inserted into an opening 223 and pressed against an inner wall 222 of the interconnect 207.

In one embodiment, the crimped connector system 400 has one or more patch launchers 219 (or connection points) stacked on each side of the package 220 that are isolated from each other using a ground plane 410. As shown in FIG. 4, the black dot on the patch launchers 219 may illustrate the points where the RF signals are received by the input connector 211 of the interconnect 207 (e.g., a via feed point) and transmitted/propagated onto the output connector 212 of the interconnect 207 (e.g., a via feed point). For additional embodiments, the ground plane 410 may include one or more ground planes formed on the package 220 (i.e., for illustration purposes in FIG. 4, the package 220 has a single ground plane 410 but more than one ground planes may be included). For some embodiments, the outer metallic wall of the interconnect 207 (and its connectors 211-212) may be electrically coupled to the ground plane 410 on top of package 220 using a conductive adhesive or a solder material (not shown) to improve the coupling and isolation between the input connector 211 and output connector 212. Additionally, a conductive adhesive (or epoxy) and/or solder may be used to tightly crimp the top and bottom surface of the package 220 to the opening walls 223 of the interconnect 207 which minimizes the separation between the package 220 and the interconnect 207 (note that this may also help improve the insertion loss and isolation [dB] of the system 400).

Note that the crimped connector system 400, as shown in FIG. 4A, may include fewer or additional packaging components based on the desired packaging design.

FIG. 4B is a plan view of the crimped connector system 400, according to one embodiment. In addition, FIG. 4B illustrates a top view of the crimped connector system 400 with the interconnect 207, the package 220, and the patch 219. Note that one or more well-known features may be omitted or simplified in order not to obscure the illustrative implementations. As illustrated in FIG. 4B, the package 220 is crimped into the interconnect 207, pressing against the inner wall 222 of the interconnect 207 (note that this top view shows a small separation between the package 220 and the inner wall 222, however the crimped connector may also be formed with no separation). Note that the crimped connector system 400, as shown in FIG. 4B, may include fewer or additional packaging components based on the desired packaging design.

FIG. 4C is a cross-sectional view of the crimped connector system 400, according to one embodiment. In addition, FIG. 4C illustrates a side view of the crimped connector system 400 with the interconnect 207, the package 220, and the connectors 211-212. Note that one or more well-known features may be omitted or simplified in order not to obscure the illustrative implementations. As illustrated in FIG. 4C, the package 220 is crimped into an opening 223 formed on the interconnect 207, as the package 220 is pressed against the inner wall 222 of the interconnect 207.

For one embodiment, the package 220 has the ground plane (as shown in FIG. 4A) that may be used to electrically couple the package 220 and the outer metallic enclosure of the interconnect 207 and connectors 211-212. Furthermore, as illustrated in FIG. 4C, the package 220 is crimped into the interconnect 207 but a small separation may form between the top and bottom surfaces of the package and the interconnect 207 (note that this side view shows a small separation, however the crimped connector 400 may also be formed with no separation or enclosed (and/or coupled) with a conductive film or any similar conductive material). Also note that the crimped connector system 400, as shown in FIG. 4C, may include fewer or additional packaging components based on the desired packaging design.

Figure 5C:
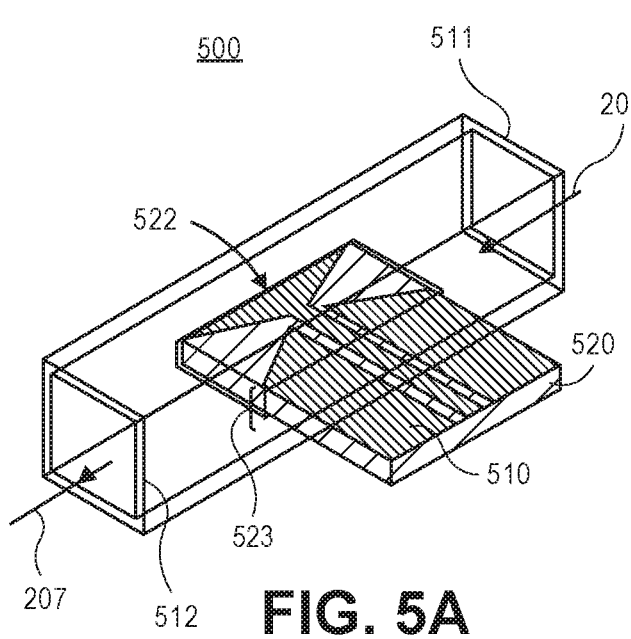
FIG. 5C is a cross-sectional view of a vertical crimped mm-wave waveguide connector system, according to one embodiment.
Figure 5C:
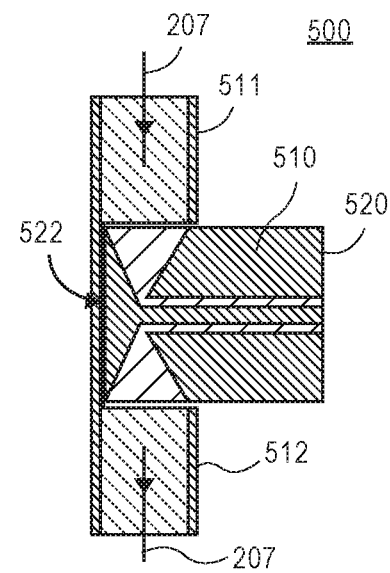
Figure 5C:
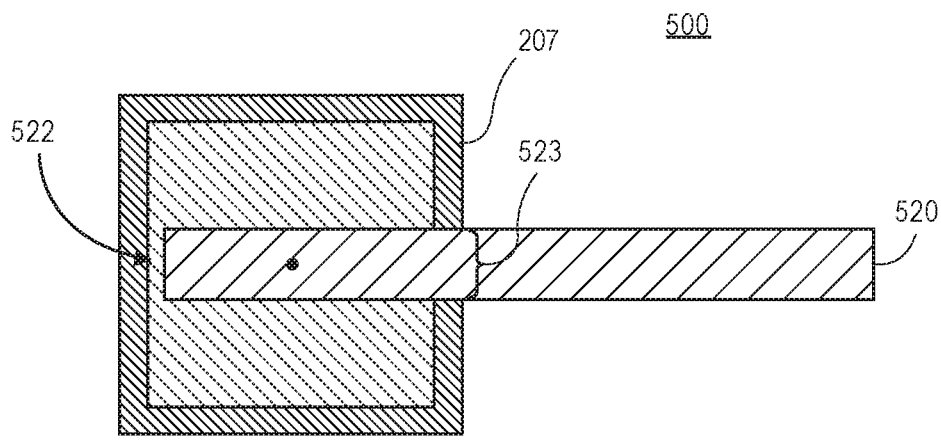
Figure 6:
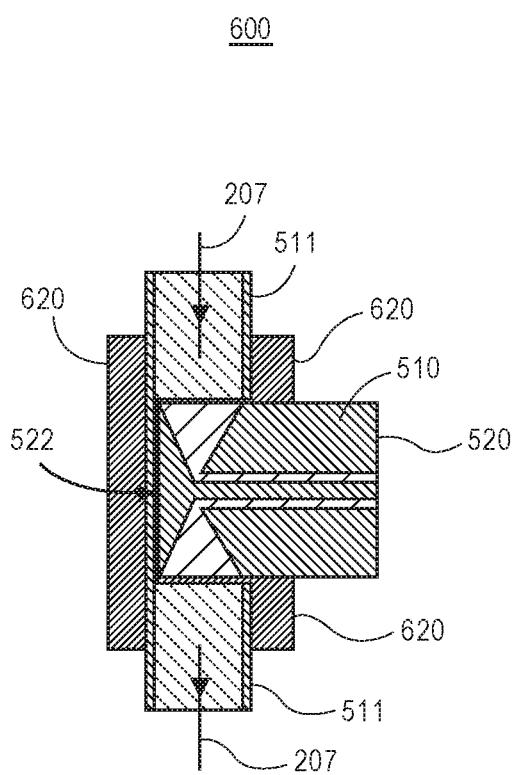
FIG. 6 is a plan view of a vertical crimped mm-wave waveguide connector system with a interconnect enclosure, according to one embodiment.

FIG. 5A is a perspective view of a vertical crimped mm-wave waveguide connector system 500, according to one embodiment. In addition, FIG. 5A illustrates a 3D view of the crimped connector system 500 with an input connector 511, an output connector 512, a package 520, and an interconnect 207. Note that the vertical crimped connector system 500 of FIGS. 5A-5C may be similar to the crimped connector systems 200, 300, and 400 of FIGS. 2-4, but the crimped connector system 500 has a vertical structure and uses one or more tapered slot based launchers (also referred to as travelling wave launchers). Also note that one or more well-known features may be omitted or simplified in order not to obscure the illustrative implementations.

According to one embodiment, the vertical crimped connector system 500 has the interconnect 207 crimped with the package 520, where the interconnect 507 has an input connector 511 and an output connector 512 to receive and output, respectively, the data transmitted by the interconnect 207. For one embodiment, the package 520 is inserted into an opening 523 and pressed against an inner wall 522 of the interconnect 207. As illustrated in FIG. 5A, the vertical connector system 500 has the opening 523 formed only on one wall of the interconnect 207 (as compared to three walls of the interconnect 207 as shown in FIG. 4A)

In one embodiment, the vertical crimped connector system 500 has one or more tapered slot based launchers 510 that are adjacent to each other on the package 520. For example, the vertical crimped connector system 500 may include two tapered slots connected back-to-back and crimped vertically into the interconnect 207. For other embodiments, the tapered slot based launchers 510 are illustrated with straight lines, but one or more other types of tapers may be used to optimize the performance of the system 500 (e.g., stepped tapers, exponential, quadratic, elliptical tapers, etc.).

For some embodiments, the tapered slots 510 are formed on the package 520 to allow for an increased/wider bandwidth on thin packages, as compared to resonant patch based launchers (e.g., patches 219 of FIG. 4A) which may require thick packages to provide a good bandwidth. However, for other embodiments, patch launchers can be easily modified to enable dual polarization using a standard packaging process as compared to tapered slot launchers which may require advanced packaging techniques to support dual polarizations. Accordingly, the crimped connector structure/system described herein may be implemented with at least one of resonant patch launchers (e.g., patches 219 of FIG. 4A) and tapered slot launcher (e.g., tapered slot launcher 510)—or any other type of relevant mm-wave signal launching technique—based on the desired packaging design and/or application.

Note that the vertical crimped connector system 500 is shown as having a vertical structure (including the formation of the tapered slot based launchers 510), however the vertical crimped connector 500 may include other type of based launchers (e.g., patch based launchers) and have any orientation (e.g., horizontal) that may be needed by the vehicle. Also note that the vertical crimped connector system 500, as shown in FIG. 5A, may include fewer or additional packaging components based on the desired packaging design.

FIG. 5B is a plan view of a vertical crimped connector system 500, according to one embodiment. In addition, FIG. 5B illustrates a top view of the vertical crimped connector system 500 with the interconnect 207, the package 520, and the tapered slot launchers 510, as the signal of the interconnect 207 is received at the input connector 511 and propagated at the output connector 512 to the other sensors (not shown). Note that one or more well-known features may be omitted or simplified (e.g., to illustrate the top view of the tapered slot launchers of FIG. 5B, the top wall of the interconnect 207 is transparent/omitted) in order not to obscure the illustrative implementations.

As illustrated in FIG. 5B, the package 520 is crimped into the interconnect 207, pressing against the inner wall 522 of the interconnect 207. In addition, the tapered slot launchers 510 may be electrically coupled to a ground plane (not shown) and the interconnect 207. For some embodiments, the tapered slot launchers may be formed to have one or more different shapes and/or sizes. Note that the vertical crimped connector system 500, as shown in FIG. 5B, may include fewer or additional packaging components based on the desired packaging design.

FIG. 5C is a cross-sectional view of a vertical connector system 500, according to one embodiment. In addition, FIG. 5C illustrates a side view of the vertical crimped connector system 500 with the interconnect 507 and the package 520. Note that one or more well-known features may be omitted or simplified in order not to obscure the illustrative implementations. As illustrated in FIG. 5C, the package 520 is crimped into an opening 523 formed on one wall of the interconnect 207, as the package 520 is pressed against the inner wall 522 of the interconnect 507.

For one embodiment, the package 520 has the ground plane (e.g., the ground plane 410 as shown in FIG. 4A) that may be used to electrically couple the package 520 and the outer metallic enclosure of the interconnect 507 and connectors 511-512 (as shown in FIGS. 5A and 5B). Furthermore, as illustrated in FIG. 5C, the package 520 is crimped into the interconnect 507 and may be fixed to the interconnect 207 using epoxy mold which is relatively cheap but rework and modification may be relatively difficult. As such, the vertical connector system 500 can include one or more mechanical support components (as shown in FIG. 6) that can allow for an easier rework and adjustment.

Note that the crimped connector system 500, as shown in FIG. 5C, may include fewer or additional packaging components based on the desired packaging design.

FIG. 6 is a plan view of a vertical connector system 600 with an interconnect enclosure 620, according to one embodiment. In addition, FIG. 6 illustrates a top view of the crimped connector system 600 with an input connector 511, an output connector 512, a package 520, an interconnect 207, and an interconnect enclosure 620. Note that the vertical crimped connector system 600 of FIG. 6 is similar to the vertical crimped connector system 500 of FIGS. 5A-5C and may be similar to the crimped connector systems 200, 300, and 400 of FIGS. 2-4. The crimped connector system 600, however, further includes the interconnect enclosure 620 that acts as a mechanical support component that allows for an easier rework and adjustment of the node. Note that one or more well-known features may be omitted or simplified in order not to obscure the illustrative implementations.

According to one embodiment, the vertical crimped connector system 600 has the interconnect 207 crimped with the package 520, where the interconnect 507 has an input connector 511 and an output connector 512 to receive and output, respectively, the data transmitted by the interconnect 207. For one embodiment, the package 520 is inserted into an opening and pressed against an inner wall 522 of the interconnect 207. As illustrated in FIG. 6, the vertical connector system 600 may have the interconnect enclosure 620 to surround (and/or enclose) at least portions of the interconnect 207, the connectors 511-512, and the package 520.

For some embodiments, the interconnect enclosure 620 may include a split snap-on module, a mechanical support, and any other mechanical enclosure that can be crimped together with the package 520 into the interconnect 207 (and its connectors 511-512). In one embodiment, the interconnect enclosure 620 may be formed with any shape and conductive material based on the desired packaging design and/or application. For illustrative purposes, the interconnect enclosure 620 is shown on both sides of the interconnect 207, however the interconnect enclosure 620 may be used to entirely surround the interconnect 207, the connectors 511-512, and the portion of the package 520 that is inserted into the opening formed on the interconnect 207 and the interconnect enclosure 620. For one embodiment, the interconnect enclosure 620 enables easier rework and adjustment of the node, but also can provide an optimized ground continuity between the ground of the package 520 and the grounded sidewalls of the interconnect 207.

Note that the vertical crimped connector system 600 may include fewer or additional packaging components based on the desired packaging design.

Figure 7:
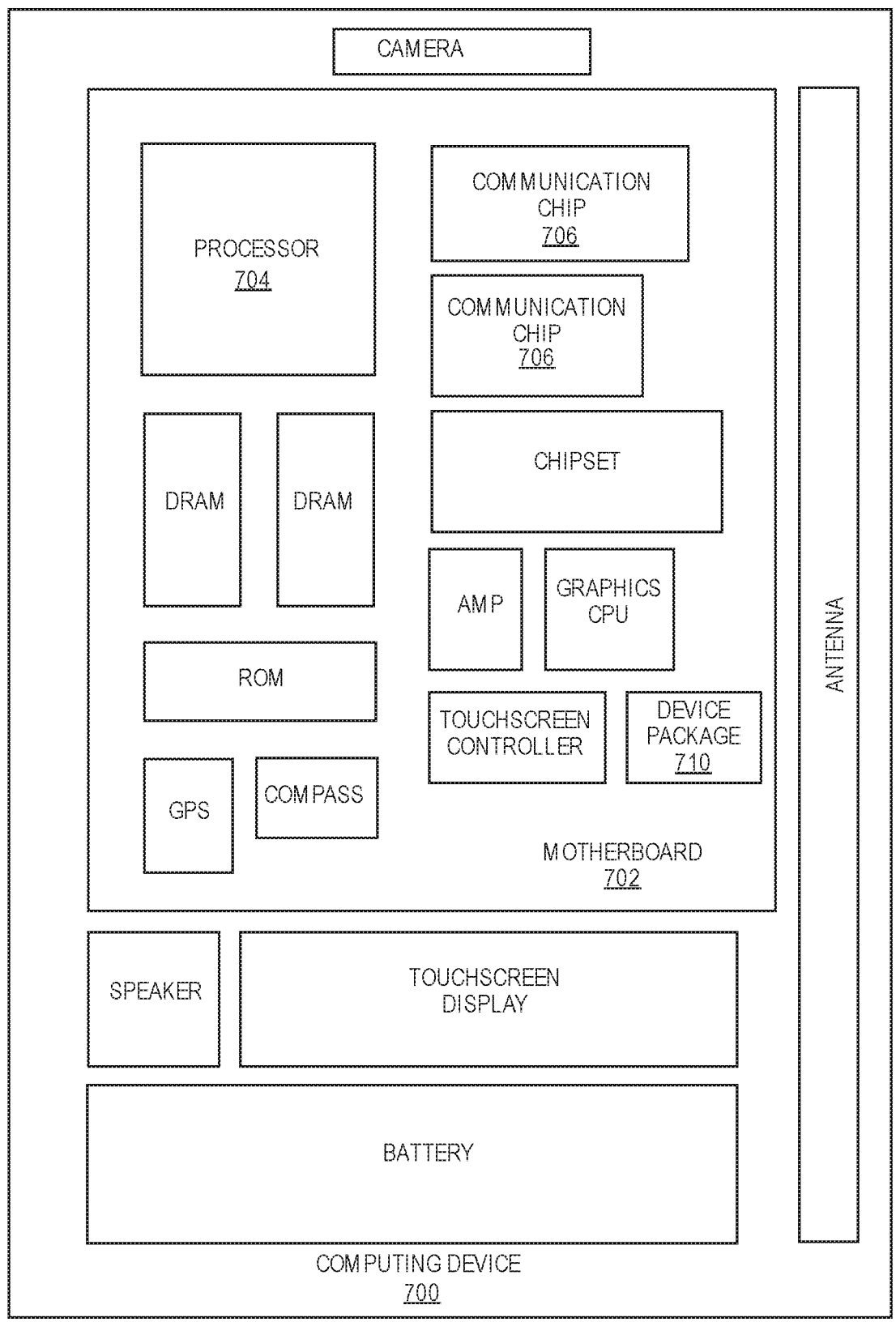
FIG. 7 is a schematic block diagram illustrating a computer system that utilizes a device package with crimped mm-wave waveguide connectors, according to one embodiment.

FIG. 7 is a schematic block diagram illustrating a computer system 700 that utilizes a device package 710 with crimped mm-wave waveguide connectors, according to one embodiment. FIG. 7 illustrates an example of computing device 700. Computing device 700 houses motherboard 702. For one embodiment, motherboard 702 may be similar to the packages of FIGS. of 2 and 4-6 (e.g., packages 220, 420, 520, and 620 of FIGS. 2 and 4-6). Motherboard 702 may include a number of components, including but not limited to processor 704, package 710 (or crimped connector package/system), and at least one communication chip 706. Processor 704 is physically and electrically coupled to motherboard 702. For some embodiments, at least one communication chip 706 is also physically and electrically coupled to motherboard 702. For other embodiments, at least one communication chip 706 is part of processor 704.

Depending on its applications, computing device 700 may include other components that may or may not be physically and electrically coupled to motherboard 702. These other components include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth).

At least one communication chip 706 enables wireless communications for the transfer of data to and from computing device 700. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. At least one communication chip 706 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. Computing device 700 may include a plurality of communication chips 706. For instance, a first communication chip 706 may be dedicated to shorter range wireless communications such as Wi-Fi and Bluetooth and a second communication chip 706 may be dedicated to longer range wireless communications such as GPS, EDGE, GPRS, CDMA, WiMAX, LTE, Ev-DO, and others.

Processor 704 of computing device 700 includes an integrated circuit die packaged within processor 704. Device package 710 may be, but is not limited to, a packaging substrate, a PCB, and a motherboard. Device package 710 has a crimped mm-wave waveguide connector system with patch based connectors, tapered slot based launchers, and the like-or any other components from the figures described herein-of the computing device 700. Device package 710 includes two connector structures crimped into one connected structure that implements dielectric and/or metallic waveguides communicatively coupled with sensor nodes to an ECU in a ring architecture, which may be used in autonomous and/or self-driving vehicles (and/or datacenters), according to some embodiments. Further, the device package 710 reduces the number of connectors per node and the overall form factor of the computing device 700.

Note that device package 710 may be a single component/device, a subset of components, and/or an entire system, as the materials, features, and components may be limited to device package 710 and/or any other component that needs crimped mm-wave waveguide connectors.

For certain embodiments, the integrated circuit die may be packaged with one or more devices on a package substrate that includes a thermally stable RFIC and antenna for use with wireless communications and the device package, as described herein, to reduce the z-height of the computing device. The term "processor" may refer to any device or portion of a device that processes electronic data from registers and/or memory to transform that electronic data into other electronic data that may be stored in registers and/or memory.

At least one communication chip 706 also includes an integrated circuit die packaged within the communication chip 706. For some embodiments, the integrated circuit die of the communication chip may be packaged with one or more devices on a package substrate that includes one or more device packages, as described herein.

In the foregoing specification, embodiments have been described with reference to specific exemplary embodiments thereof. It should be borne in mind, however, that all of these and similar terms are to be associated with the appropriate physical quantities and are merely convenient labels applied to these quantities. It will be evident that various modifications may be made thereto without departing from the broader spirit and scope. The specification and drawings are, accordingly, to be regarded in an illustrative sense rather than a restrictive sense.

The following examples pertain to further embodiments. The various features of the different embodiments may be variously combined with some features included and others excluded to suit a variety of different applications.

The following examples pertain to further embodiments:

Example 1 is a sensor node, comprising an interconnect with an input connector, an output connector, and an opening on one or more sidewalls of the interconnect; and a package with one or more sidewalls, a top surface, and a bottom surface that is opposite of the top surface. At least one of the sidewalls of the package is disposed on the opening of the interconnect.

In example 2, the subject matter of example 1 can optionally include further comprising a control circuit on the package; a first millimeter-wave (mm-wave) launcher on the package; and a sensor communicatively coupled to the control circuit. The sensor is communicatively coupled to the control circuit with an electrical cable.

In example 3, the subject matter of any of examples 1-2 can optionally include at least one of the sidewalls of the package is adjacent and co-planar to an inner wall of the interconnect, and the at least one of the sidewalls of the package is crimped by the opening of the interconnect.

In example 4, the subject matter of any of examples 1-3 can optionally include the interconnect as a waveguide. The input connector and output connectors are waveguide connectors. The waveguide is coupled to the package by the waveguide connectors. The waveguide is communicatively coupled to the first mm-wave launcher with one of the waveguide connectors. The waveguide is communicatively coupled to a second mm-wave launcher with the other waveguide connector.

In example 5, the subject matter of any of examples 1-4 can optionally include the first mm-wave launcher and the second mm-wave launcher are single layer resonant patch launchers, stacked-patch launchers, tapered slot launchers, leaky-wave launchers, or microstrip-to-slot transition launchers.

In example 6, the subject matter of any of examples 1-5 can optionally include the waveguide is at least one of a metallic waveguide and a dielectric waveguide.

In example 7, the subject matter of any of examples 1-6 can optionally include the control circuit which includes a diplexer, a power combiner, and a transceiver. The transceiver includes a radio frequency (RF) input, a RF output, a baseband input, and a baseband output.

In example 8, the subject matter of any of examples 1-7 can optionally include the input connector communicatively coupled to the diplexer. The diplexer is communicatively coupled to the power combiner and the transceiver. The transceiver is communicatively coupled to the sensor and the power combiner. The power combiner is communicatively coupled to the output connector.

In example 9, the subject matter of any of examples 1-8 can optionally include further comprising a conductive layer disposed between the opening of the interconnect and the outer surfaces of the package that are crimped with the opening of the interconnect; and an interconnect enclosure coupled to the interconnect. The interconnect enclosure surrounds at least portions of the interconnect, the input and output connectors, and the package.

Example 10 is a method of forming a sensor node, comprising forming an interconnect with an input connector, an output connector, and an opening on one or more sidewalls of the interconnect; and disposing a package with at least one of the sidewalls of the package on the opening of the interconnect. The package includes one or more sidewalls, a top surface, and a bottom surface that is opposite of the top surface.

In example 11, the subject matter of example 10 can optionally include further comprising disposing a control circuit on the package; disposing a first mm-wave launcher on the package; and communicatively coupling a sensor to the control circuit with a cable.

In example 12, the subject matter of any of examples 10-11 can optionally include at least one of the sidewalls of the package is adjacent and co-planar to an inner wall of the interconnect, and at least one of the sidewalls of the package is crimped by the opening of the interconnect.

In example 12, the subject matter of any of examples 10-11 can optionally include at least one of the sidewalls of the package is adjacent and co-planar to an inner wall of the interconnect, and the at least one of the sidewalls of the package is crimped by the opening of the interconnect.

In example 13, the subject matter of any of examples 10-12 can optionally include the interconnect as a waveguide. The input connector and output connectors are waveguide connectors. The waveguide is coupled to the package by the waveguide connectors. The waveguide is communicatively coupled to the first mm-wave launcher with one of the waveguide connectors. The waveguide is communicatively coupled to a second mm-wave launcher with the other waveguide connector.

In example 14, the subject matter of any of examples 10-13 can optionally include the first mm-wave launcher and the second mm-wave launcher are single layer patch launchers, stacked-patch launchers, tapered slot launchers, or microstrip-to-slot transition launchers.

In example 15, the subject matter of any of examples 10-14 can optionally include the waveguide is at least one of a metallic waveguide and a dielectric waveguide.

In example 16, the subject matter of any of examples 10-15 can optionally include the control circuit which includes a diplexer, a power combiner, and a transceiver. The transceiver includes a radio frequency (RF) input, a RF output, a baseband input, and a baseband output.

In example 17, the subject matter of any of examples 10-16 can optionally include the input connector communicatively coupled to the diplexer. The diplexer is communicatively coupled the power combiner and the transceiver. The transceiver is communicatively coupled to the sensor and the power combiner. The power combiner is communicatively coupled to the output connector.

In example 18, the subject matter of any of examples 10-17 can optionally include further comprising disposing a conductive layer between the opening of the interconnect and the outer surfaces of the package that are crimped with the opening of the interconnect; and coupling an interconnect enclosure to the interconnect. The interconnect enclosure surrounds at least portions of the interconnect, the input and output connectors, and the package.

Example 19 is a vehicle including a communication system, comprising an electronic control unit (ECU); and a plurality of interconnects. A first interconnect is communicatively coupled to the ECU; and a plurality of sensor nodes. A first sensor node is communicatively coupled to the ECU by the first interconnect. Each of the subsequent sensor nodes are coupled to each other in a ring architecture by additional interconnects. Each sensor node comprises an interconnect with an input connector, an output connector, and an opening on one or more sidewalls of the interconnect; and a package with one or more sidewalls, a top surface, and a bottom surface that is opposite of the top surface. At least one of the sidewalls of the package is disposed on the opening of the interconnect; and a plurality of sensors. Each sensor communicates with the ECU over a different frequency band.

In example 20, the subject matter of example 19 can optionally include that each sensor node further comprises a control circuit on the package. The control circuit includes a diplexer, a power combiner, and a transceiver. The transceiver includes a radio frequency (RF) input, a RF output, a baseband input, and a baseband output; a first mm-wave launcher on the package; and a first sensor of the plurality of sensors communicatively coupled to the control circuit. The first sensor is communicatively coupled to the control circuit with an electrical cable. Each sensor is communicatively coupled to a different control circuit.

In example 21, the subject matter of any of examples 19-20 can optionally include at least one of the sidewalls of the package is adjacent and co-planar to an inner wall of the interconnect, and the at least one of the sidewalls of the package is crimped by the opening of the interconnect.

In example 22, the subject matter of any of examples 19-21 can optionally include the interconnect as a waveguide. The waveguide is at least one of a metallic waveguide and a dielectric waveguide. The input connector and output connectors are waveguide connectors. The waveguide is coupled to the package by the waveguide connectors. The waveguide is communicatively coupled to the first mm-wave launcher with one of the waveguide connectors. The waveguide is communicatively coupled to a second mm-wave launcher with the other waveguide connector.

In example 23, the subject matter of any of examples 19-22 can optionally include the first mm-wave launcher and the second mm-wave launcher are single layer resonant patch launchers, stacked-patch launchers, tapered slot launchers, leaky-wave launchers, or microstrip-to-slot transition launchers.

In example 24, the subject matter of any of examples 19-23 can optionally include the first interconnect communicatively coupled to the input connector. The input connector is communicatively coupled to the diplexer. The diplexer is communicatively coupled the power combiner and the transceiver. The transceiver is communicatively coupled to the sensor and the power combiner. The power combiner is communicatively coupled to the output connector. The output connector is communicatively coupled to at least the first interconnect and a second interconnect of the plurality of interconnects.

In example 25, the subject matter of any of examples 19-24 can optionally include a conductive layer disposed between the opening of the interconnect and the outer surfaces of the package that are crimped with the opening of the interconnect; and an interconnect enclosure coupled to the interconnect. The interconnect enclosure surrounds at least portions of the interconnect, the input and output connectors, and the package.

In the foregoing specification, methods and apparatuses have been described with reference to specific exemplary embodiments thereof. It will be evident that various modifications may be made thereto without departing from the broader spirit and scope. The specification and drawings are, accordingly, to be regarded in an illustrative sense rather than a restrictive sense.

What is claimed is:

1. A sensor node, comprising:
   an interconnect with an input connector, an output connector, and an opening that extends through one or more sidewalls of the interconnect, wherein the opening exposes an inner sidewall of the interconnect, the inner sidewall opposite the opening; and
   a package with one or more sidewalls, a top surface, and a bottom surface that is opposite of the top surface, wherein a portion of the package is disposed entirely within the opening of the interconnect, and wherein the portion includes a region of a sidewall of the package that is directly coupled to the inner sidewall in the opening of the interconnect.

2. The sensor node of claim 1, further comprising:
   a control circuit on the package;
   a first millimeter-wave (mm-wave) launcher on the package; and
   a sensor communicatively coupled to the control circuit, wherein the sensor is communicatively coupled to the control circuit with an electrical cable.

3. The sensor node of claim 1, wherein the at least one of the sidewalls of the package is adjacent and co-planar to an inner wall of the interconnect, and the at least one of the sidewalls of the package is crimped by the opening of the interconnect.

4. The sensor node of claim 2, wherein the interconnect is a waveguide, wherein the input connector and output connectors are waveguide connectors, wherein the waveguide is coupled to the package by the waveguide connectors, wherein the waveguide is communicatively coupled to the first mm-wave launcher with one of the waveguide connectors, and wherein the waveguide is communicatively coupled to a second mm-wave launcher with the other waveguide connector.

5. The sensor node of claim 4, wherein the first mm-wave launcher and the second mm-wave launcher are single layer resonant patch launchers, stacked-patch launchers, tapered slot launchers, leaky-wave launchers, or microstrip-to-slot transition launchers.

6. The sensor node of claim 4, wherein the waveguide is at least one of a metallic waveguide and a dielectric waveguide.

7. The sensor node of claim 2, wherein the control circuit includes a diplexer, a power combiner, and a transceiver, and wherein the transceiver includes a radio frequency (RF) input, a RF output, a baseband input, and a baseband output.

8. The sensor node of claim 7, wherein the input connector is communicatively coupled to the diplexer, wherein the diplexer is communicatively coupled to the power combiner and the transceiver, wherein the transceiver is communicatively coupled to the sensor and the power combiner, and wherein the power combiner is communicatively coupled to the output connector.

9. The sensor node of claim 3, further comprising:
   a conductive layer disposed between the opening of the interconnect and the outer surfaces of the package that are crimped with the opening of the interconnect; and
   an interconnect enclosure coupled to the interconnect, wherein the interconnect enclosure surrounds at least portions of the interconnect, the input and output connectors, and the package.

* * * * *